(12) United States Patent
Kwon et al.

(10) Patent No.: US 12,485,808 B2
(45) Date of Patent: Dec. 2, 2025

(54) VEHICLE ASSIST HANDLE

(71) Applicant: DAEHAN SOLUTION CO., LTD, Incheon (KR)

(72) Inventors: Choong Ho Kwon, Seoul (KR); Young-Jae Lee, Incheon (KR)

(73) Assignee: DAEHAN SOLUTION CO., LTD, Incheon (KR)

( * ) Notice: Subject to any disclaimer, the term of this patent is extended or adjusted under 35 U.S.C. 154(b) by 375 days.

(21) Appl. No.: 18/224,098

(22) Filed: Jul. 20, 2023

(65) Prior Publication Data

US 2024/0067071 A1 Feb. 29, 2024

(30) Foreign Application Priority Data

Aug. 25, 2022 (KR) .................. 10-2022-0106556

(51) Int. Cl.
*B60N 3/02* (2006.01)
(52) U.S. Cl.
CPC .................................. *B60N 3/023* (2013.01)
(58) Field of Classification Search
CPC .............................. B60N 3/023; B60N 3/026
USPC ....................................................... 296/1.02
See application file for complete search history.

(56) References Cited

U.S. PATENT DOCUMENTS

| | | | | |
|---|---|---|---|---|
| 6,003,928 A * | 12/1999 | Curtindale | ............. | B60J 3/0221 296/214 |
| 6,715,812 B2 * | 4/2004 | Sakuma | ................. | B60N 3/023 411/45 |
| 10,399,476 B2 * | 9/2019 | Ranganathan | ............ | B60R 7/04 |
| 10,703,286 B2 * | 7/2020 | Patterson | ............ | B62D 33/0273 |
| 11,383,628 B2 * | 7/2022 | Shitara | ...................... | F16B 5/02 |
| 11,548,426 B2 * | 1/2023 | Zarraga | .................. | B60N 3/026 |
| 11,993,189 B2 * | 5/2024 | Myers | ..................... | B60R 11/00 |
| 12,151,545 B2 * | 11/2024 | Demming | ............. | B60J 7/1858 |
| 12,319,189 B2 * | 6/2025 | Hammelef | ............. | B60N 3/023 |
| 2015/0210220 A1 * | 7/2015 | Ross | ........................ | B60R 7/10 296/1.02 |

(Continued)

FOREIGN PATENT DOCUMENTS

| | | | | |
|---|---|---|---|---|
| FR | 3142137 A1 * | 5/2024 | ............. | B60N 3/026 |
| KR | 19980017358 U * | 7/1998 | ............. | B60N 3/023 |

(Continued)

OTHER PUBLICATIONS

Translation of FR3142137A1 (Year: 2025).*

(Continued)

*Primary Examiner* — Jason S Morrow
(74) *Attorney, Agent, or Firm* — Dickinson Wright PLLC (57) ABSTRACT

A vehicle assist handle is formed so that a guide block is mounted on a surface of a headliner on which the assist handle is mounted and which is fixedly fitted into or separated from the guide block in a sliding manner to be used for other purposes by separating the assist handle from the surface of the headliner. The vehicle assist handle may be pushed in a direction parallel to the surface of the headliner to be assembled or separated when slidably guided to the guide block. The guide block can support a weight of an occupant applied to the assist handle. The vehicle assist handle can be used safely and conveniently. In addition, as a sunglass case, a storage case, or a rack may be fixedly coupled to the guide block in the sliding manner.

3 Claims, 7 Drawing Sheets

(56) References Cited

U.S. PATENT DOCUMENTS

2016/0121811 A1* 5/2016 Kwon .................... B60N 3/026
                                                                                       296/214
2023/0382286 A1* 11/2023 Kwon .................... B60N 3/023

FOREIGN PATENT DOCUMENTS

| KR | 19980029465 U | * | 8/1998 | ............ B60N 3/023 |
| KR | 19990029200 U | * | 7/1999 | |
| KR | 101190730 B1 | | 10/2012 | |
| KR | 101380562 B1 | | 4/2014 | |
| KR | 101733597 B1 | | 5/2017 | |
| KR | 101815043 B1 | * | 1/2018 | ............ B60N 3/026 |

OTHER PUBLICATIONS

Translation of KR101815043B1 (Year: 2025).*
Translation of KR19980017358-U (Year: 2025).*
Translation of KR19980029465-U (Year: 2025).*
Translation of KR19990029200-U (Year: 2025).*

* cited by examiner

VEHICLE ASSIST HANDLE

CROSS-REFERENCE TO RELATED APPLICATION

This application claims priority to and the benefit of Korean Patent Application No. 10-2022-0106556, filed on Aug. 25, 2022, the disclosure of which is incorporated herein by reference in its entirety.

BACKGROUND OF THE INVENTION

1. Field of the Invention

The present invention relates to a vehicle assist handle, and more specifically, to a vehicle assist handle, in which a handle body gripped by the hand of an occupant to be used in a vehicle is slidably fitted into a guide block mounted on a headliner to be assembled with or separated from the guide block, and when the assist handle is not used, a sunglass case, a storage case, a rack, or the like is slidably mounted on the guide block so that the vehicle assist handle has a multipurpose use. In this case, when the handle body is mounted on the guide block, the assist handle is formed so that a sliding direction is parallel to a surface of the headliner, and thus, even when a weight of the occupant is applied to the assist handle, the assist handle can sufficiently withstand the applied weight and can be used safely.

2. Discussion of Related Art

Figure 1:
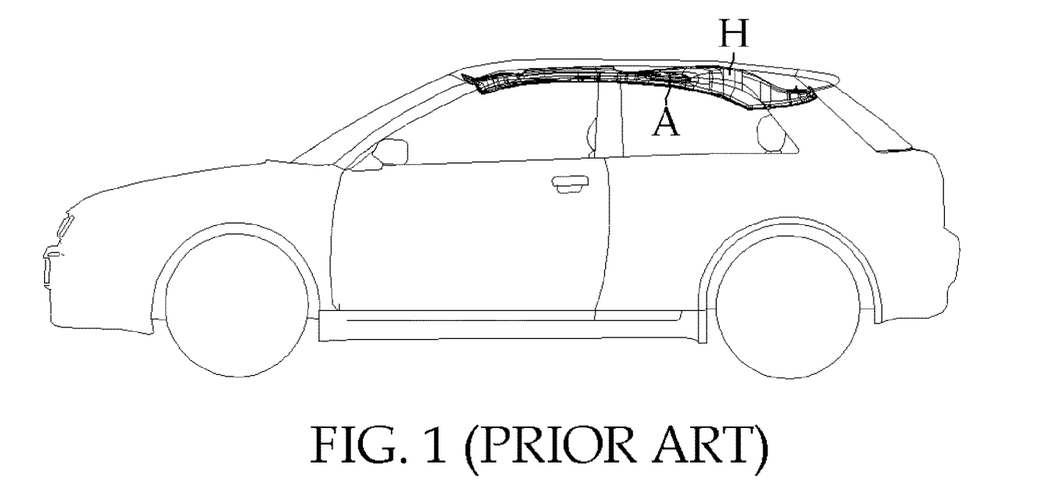
FIG. 1 is a side view illustrating a position at which a headliner on which an assist handle is mounted is installed in a vehicle.
Figure 2A:
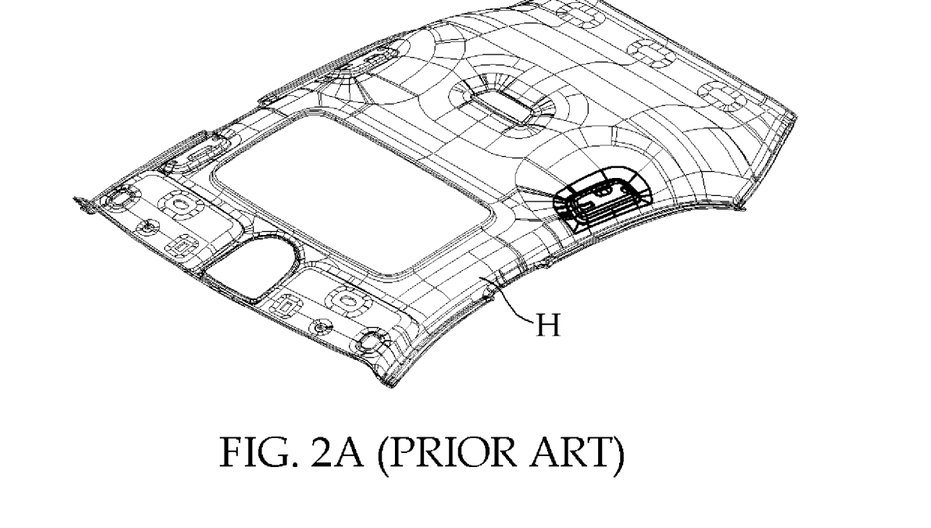
FIG. 2A is a perspective view illustrating a position at which the assist handle is mounted on the headliner.
Figure 2B:
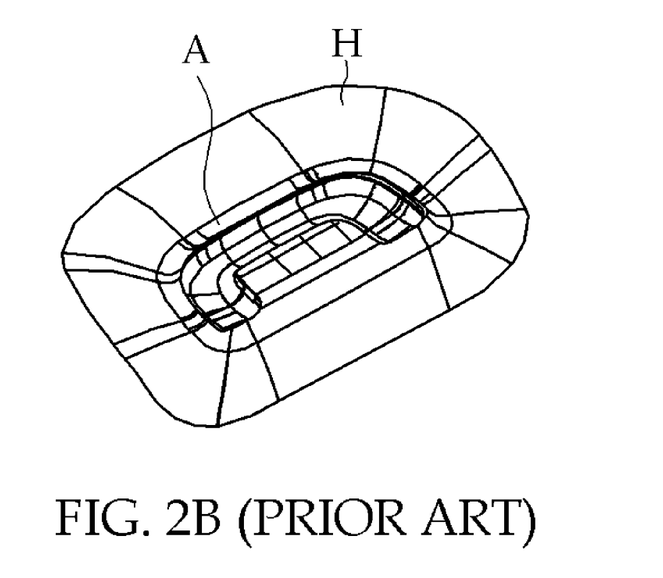
FIG. 2B is a perspective bottom view illustrating an example of the assist handle mounted on the headliner.

In general, as illustrated in FIGS. 1 and 2, an assist handle A is provided on a headliner H of a vehicle in order that an occupant may conveniently and comfortably sit and balance while traveling. The assist handle A is manufactured to allow the occupant to conveniently sit and move without losing balance when the vehicle travels and to be used for various purposes in addition to that of the handle when the occupant does not use the assist handle A as described in Patent Document 1 to Patent Document 3.

(Patent Document 1) Korean Patent Registration No. 10-1733597

The patent is directed to providing a vehicle assist handle having an air vent function, in which, since cold air or outside air supplied through an air conditioner may be discharged through an assist handle, an air vent grille and the like constituting a head lining may be omitted, and since a fluid may be blown through the assist handle which is usually essentially provided, the aesthetics of an interior of a vehicle may not be degraded, and hot air or cold air may also be safely and conveniently blown so that the vehicle assist handle can be easily and conveniently used. In particular, the patent is also directed to providing a vehicle assist handle, in which, since there is no need to mount an air vent on a head lining, the head lining may also be variously and simply designed without degrading the aesthetics of the head lining, and thus an interior environment of the vehicle can be created in a desired shape.

(Patent Document 2) Korean Patent Registration No. 10-1380562

The patent is directed to providing a vehicle assist handle with further improved convenience, in which, as a lamp function and a heating function are implemented on the vehicle assist handle installed in an interior for the convenience of an occupant, the occupant may use an additional lighting and heat transfer functions in addition to a handle function. In particular, the patent is also directed to providing a vehicle assist handle which may be used for various functions according to a use purpose of a lamp in the night using a light-emitting diode (LED) lamp as a reading, induction, or mood lamp. In addition, the patent is also directed to providing a vehicle assist handle having lighting and heat transfer functions, in which a controller is provided for controlling the lighting and heat transfer functions, and an electronic control unit (ECU) which is provided in advance in a vehicle and is used as the controller, and thus the number of components is minimized and an optimal function may also be implemented.

(Patent Document 3) Korean Patent Registration No. 10-1190730

The patent is directed to providing a vehicle assist handle, which is installed in a vehicle and operated to be turned when an occupant gets on and off the vehicle and in which a damping function is provided by a compression spring in a restoration direction of the assist handle so that smoother rotation may be performed when restoration turning is performed. A structure for achieving the above-described objectives includes a fixed member installed in a vehicle body and having a first sliding weight surface for rotational support, a rotating member having a second sliding weight surface in contact with the first sliding weight surface of the fixed member and coupled to be rotatable with respect to the fixed member, a handle member coupled to the rotating member, a torsion spring installed between the fixed member and the rotating member to provide a recovery force in a reverse turning direction of the rotating member with respect to the fixed member, and a compression spring installed between the fixed member and the rotating member to provide a damping force when reverse turning of the rotating member is performed with respect to the fixed member.

RELATED ART

Patent Document (Patent Document 1) Korean Patent Registration No. 10-1733597 (Registration Date: Apr. 28, 2017)
(Patent Document 2) Korean Patent Registration No. 10-1380562 (Registration Date: Mar. 25, 2014)
(Patent Document 3) Korean Patent Registration No. 10-1190730 (Registration Date: Jan. 8, 2012)

However, since the conventional assist handle is fixedly mounted on a headliner and used, there are the following inconveniences.

(1) When an assist handle is not used, the assist handle may not be used for other functions, and thus the utilization of a space is reduced.

(2) In particular, as camping using a vehicle has become popular in recent years, a tent is connected to a vehicle and used, when a space of the vehicle is used as described above, an assist handle is fixedly maintained on a headliner, and thus it is difficult to use the assist handle for other purposes.

(3) In addition, when an assist handle is not used as described above, the assist handle is in close contact with a headliner, and thus a utilization efficiency of a space in a vehicle is reduced.

(4) Meanwhile, in order to use an assist handle, since a handle body which is elastically supported by and is in close contact with a headliner is turned and used, the handle body may be turned when the assist handle is used for other purposes, and thus there is also inconvenience in use.

SUMMARY OF THE INVENTION

The present invention is provided in consideration of the above-described points and directed to providing a vehicle assist handle, in which a guide block is mounted on a surface of a headliner on which the assist handle is mounted, fixedly fitted into or separated from the guide block in a sliding manner to be used for other purposes by separating the assist handle from the surface of the headliner when not used.

In particular, the present invention also directed to providing a vehicle assist handle which is pushed in a direction parallel to a surface of a headliner to be assembled with or separated from a guide block when slidably guiding the assist handle so that the guide block sufficiently supports a weight of an occupant applied to the assist handle and the vehicle assist handle is used safely and conveniently.

In addition, the present invention also directed to providing a vehicle assist handle in which a sunglass case, a storage case, or a rack is fixedly coupled to a guide block in a sliding manner so that the assist handle is variously used according to a purpose when not used as the assist handle.

According to an aspect of the present invention, there is provided a vehicle assist handle comprising a support bracket (110) which elastically supports a handle body (100) mounted on a headliner (H) of a vehicle, gripped and used by a hand of an occupant, and supported to be forcibly rotated, wherein the support bracket (110) is separated from the headliner (H) and detachably installed on a guide block (200) mounted at a position of the separated headliner (H), guide protrusions (111) are formed to protrude from both sides of a surface of the support bracket (110) facing the guide block (200), a guide (210) is formed in the guide block (200) to slidably guide the protrusion (111), and stoppers (220), which face each other and in which one side is installed to be rotated in place and the other side is caught on the guide protrusion (111) seated in the guide (200) to perform a latching action, are formed outside the guide block (200).

In particular, the guide (210) may be formed parallel to a surface of the headliner (H) on which the guide block (200) is mounted to slidably guide the guide protrusion (111) to the guide block (200) in a direction intersecting a direction in which the hand of the occupant grips and pulls the handle body (100).

a sunglasses case, a storage case, or a rack formed to be fitted into and slidably guided by the guide (210) may be hung on the guide block (200) so that the guide block (200) has a multipurpose use.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

Hereinafter, exemplary embodiments of the present invention will be described in more detail with reference to the accompanying drawings. Moreover, terms and words used in the present specification should not be interpreted as being limited to commonly used meanings or meanings in dictionaries and should be interpreted as having meanings and concepts which are consistent with the technological scope of the invention based on the principle that the inventors have appropriately defined concepts of terms in order to describe the invention in the best way.

Therefore, since the embodiments described in this specification and components illustrated in the drawings are only exemplary embodiments and do not represent the overall technological scope of the invention, it should be understood that there may be various equivalents or modifications substituting the exemplary embodiments at the time of filing of this application.

Structure of Vehicle Assist Handle

As illustrated in FIGS. 3 to 6, a vehicle assist handle according to the present invention includes support brackets 110 mounted on a headliner H and a handle body 100 elastically supported by the support brackets 110 and installed to be rotatable in place.

In this case, as the support brackets 110 installed so that the support brackets 110 are separated from the headliner H and detachably installed on guide blocks 200 mounted on a place of the headliner H on which the support brackets 110 are mounted, the utilization of a space can be improved.

In particular, as the support brackets 110 are fixedly assembled with or separated from the guide blocks 200 in a sliding manner and slid in a direction parallel to a surface of the headliner H to be assembled therewith, the support brackets 110 sufficiently withstand a weight of an occupant applied to the handle body 100 and are safely used.

In addition, each of the guide blocks 200 is provided to be assembled with or separated from a sunglasses case, or a storage case, or a rack on which a component allowing the sunglasses case, the storage case, or the rack to be assembled with or separated from each of the support brackets 110 is equipped, and thus the assist handle can be used for various purposes.

Hereinafter, the structure will be described in more detail with reference to the accompanying drawings as follows.

A. Handle Body

Figure 3:
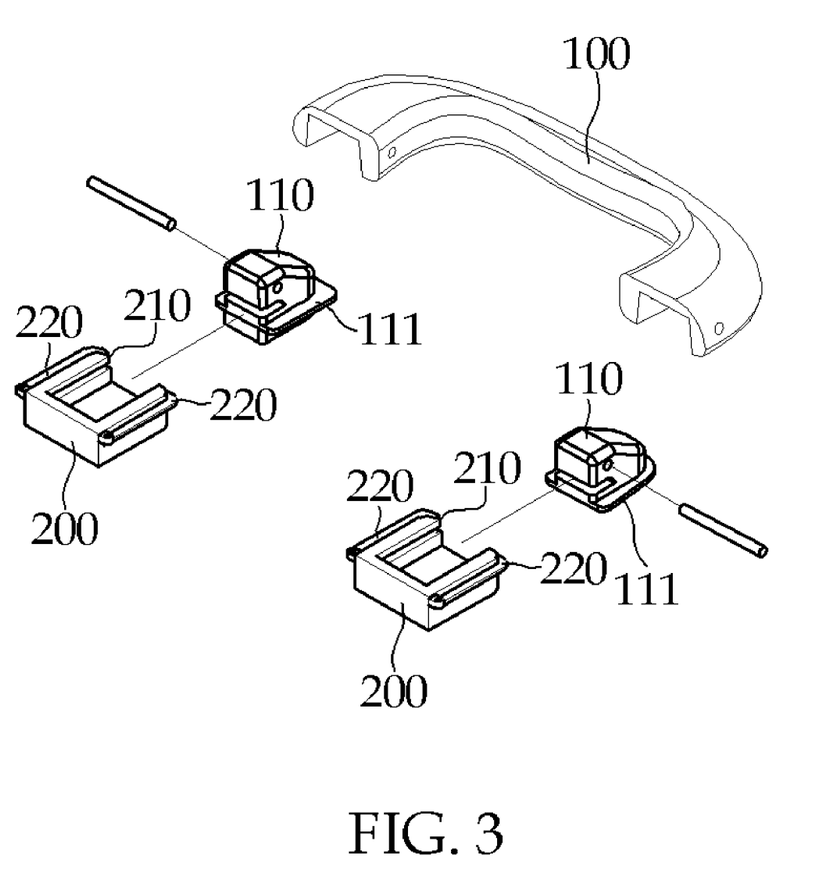
FIG. 3 is an exploded perspective view illustrating components of a vehicle assist handle according to the present invention.
Figure 4:
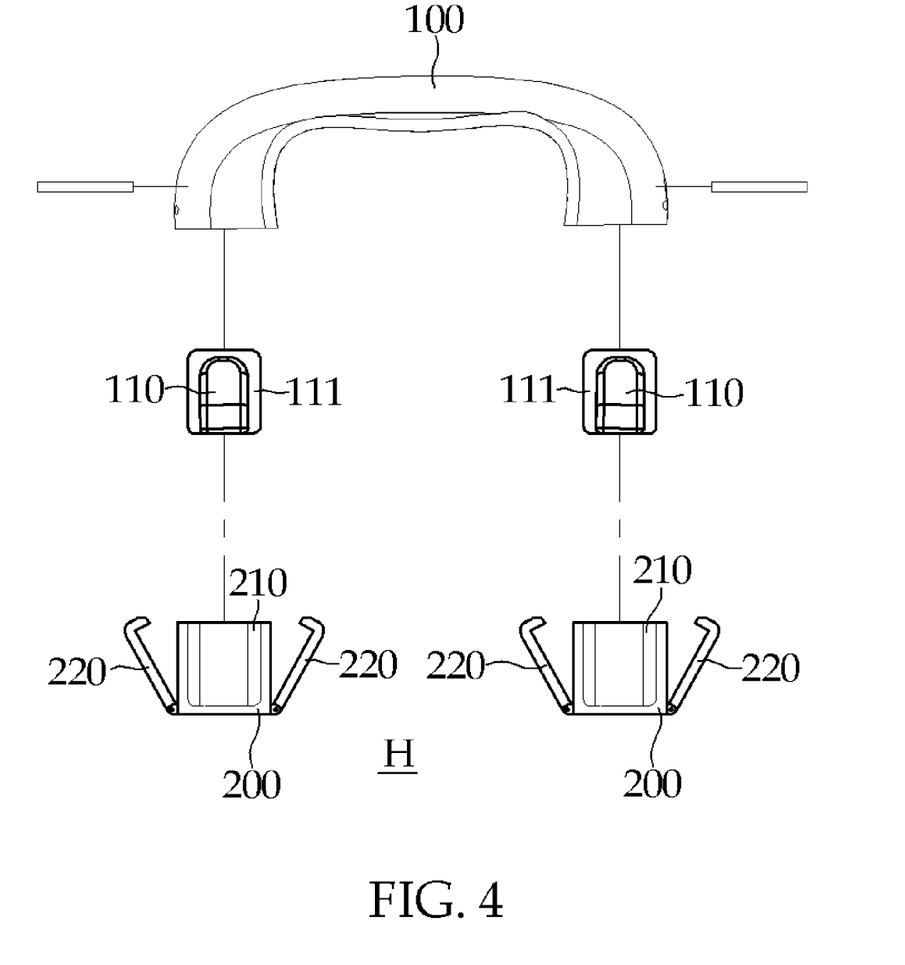
FIG. 4 is an exploded bottom view illustrating the components of the vehicle assist handle according to the present invention.
Figure 5:
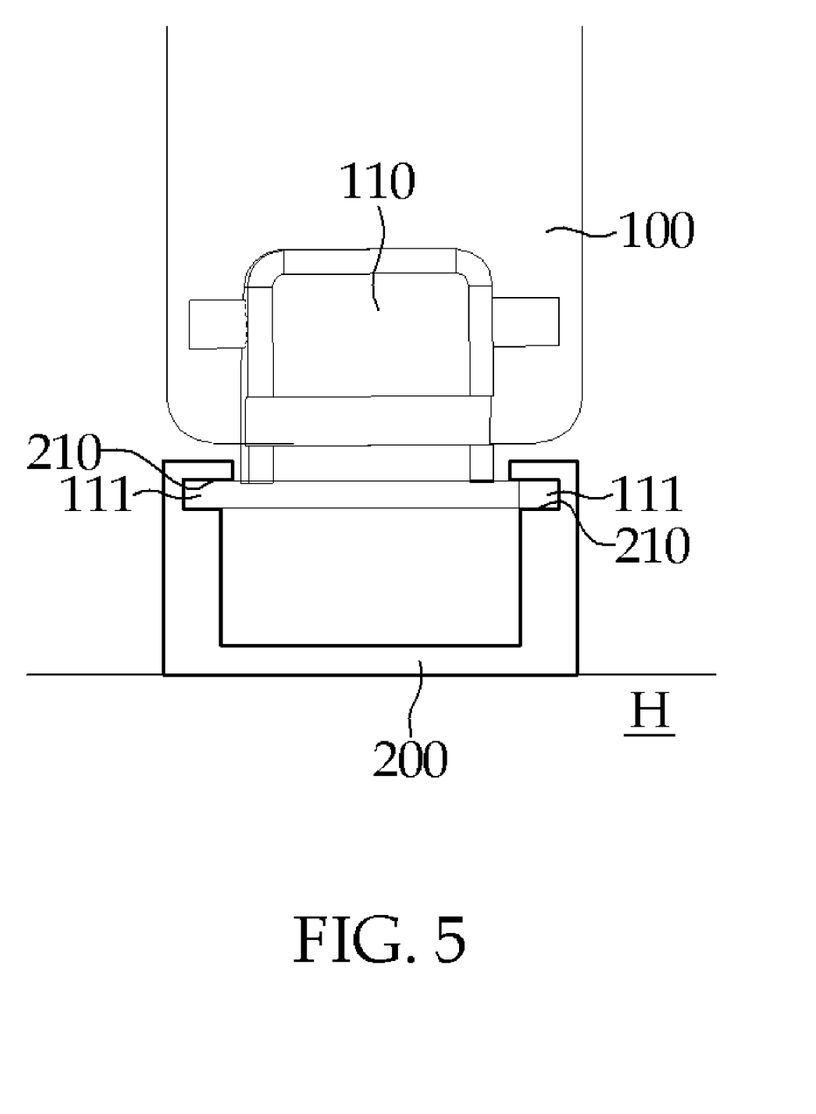
FIG. 5 is a cross-sectional view illustrating a state in which a support bracket is mounted on a guide block according to the present invention.

As illustrated in FIGS. 3 to 5, the handle body 100 is elastically supported and is in close contact with the headliner H, and when necessary, the occupant forcibly turns the handle body 100 and uses the handle body 100 as a handle. The handle body 100 is manufactured to have a length so that the occupant may grip the handle body 100 with one hand, and the support bracket 110 is provided on one side or both sides of the handle body 100 to rotatably support the handle body 100. In the drawings, an example in which two support brackets 110 are each provided on one between both sides of the handle body 100 is illustrated.

B. Support Bracket

As illustrated in FIGS. 3 to 5, the handle body 100 is mounted on and elastically supported by one side of the support bracket 110 to be rotatable in place, and a guide protrusion 111 is formed the other side of the support bracket 110 to protrude to face the guide block 200 mounted on the headliner H.

In this case, the guide protrusion 111 may be formed to protrude from a surface facing the surface of the headliner H, but as illustrated in FIGS. 3 to 5, as the guide protrusion 111 protrudes outward from both sides facing the surface of the headliner H, when the support bracket 110 is fitted into and slid on the guide block 200, which will be described below, the guide protrusion 111 may have a guide function and may be supported by the guide block 200 so that the support bracket 110 is not separated from the guide block 200.

In addition, in the exemplary embodiment of the present invention, as illustrated in FIGS. 4 and 5, the guide protrusion 111 is formed so that, when the guide protrusion 111 is fitted into and slid on the guide block 200 mounted on the headliner H, the support bracket 110 is slid on and assembled with the guide block 200 in the direction parallel to the surface of the headliner H, when the handle body 100 is used after being turned from the headliner H, even though a direction in which the weight of the occupant is applied to the handle body 100 intersects a direction in which the support bracket 110 slides, the guide protrusion 111 may sufficiently withstand the weight.

As illustrated in FIGS. 3 to 5, one side of the support bracket 110 is mounted on an end portion of the handle body 100 to elastically support the handle body 100 so that the handle body 100 is supported to be rotatable in place, and the other side is fixedly assembled with the guide block 200, which will be described below, mounted on the headliner H in the sliding manner.

C. Guide Block

As illustrated in FIGS. 3 to 5, the guide block 200 is mounted on the headliner H, and the support bracket 110 is fitted into the guide block 200 in the sliding manner so that the support bracket 110 may be fixedly supported by or separated from the guide blocks 200.

As illustrated in FIGS. 3 to 6, the guide block 200 includes a guide 210 and two stoppers 220.

1. Guide

The guide 210 guides the support bracket 110 to be assembled with the guide block 200 in the sliding manner by fitting the guide protrusion 111 into the guide block 200 as illustrated in FIGS. 3 to 5. The guide 210 may be formed in any shape as long as guiding the guide protrusion 111 in the sliding manner according to a shape of the guide protrusion 111.

In the exemplary embodiment of the present invention, as illustrated in FIGS. 4 and 5, the guide 210 may be formed to safely support the support bracket 110 so that, when the support bracket 110 is fitted into and coupled to the guide block 200 in the sliding manner, the support bracket 110 is pushed in the direction parallel to the surface of the headliner H to be coupled to the guide block 200, and even when the weight of the occupant is applied thereto in a direction perpendicular to the surface of the headliner H, the support bracket 110 is not separated from or pulled out of the guide 210.

2. Stopper

As illustrated in FIGS. 3 to 5, the stoppers 220 are each mounted on both sides of the guide block 200 to be rotatable in place with respect to one side. In this case, as the stopper 220 rotates in place, the other side is caught on an end portion of the guide protrusion 111 accommodated in the guide 210, and thus the stopper 220 supports the support bracket 110 so that the support bracket 110 is not separated from or pulled out of the guide block 200.

In the exemplary embodiment of the present invention, the stopper 220 may be installed so that a spring is mounted along an axis which is a rotation center of the stopper and the stopper 220 is elastically supported using an elastic force of the spring to face the guide block 200. This is to force, when the stopper 220 installed to face the guide block 200 is opened and released, the stopper 220 to return to the original position and to be caught on the guide protrusion 111 to perform a latching action, and this is to prevent the stopper 220 from being separated from or pulled out by an elastic force in the caught state.

Figure 6A:
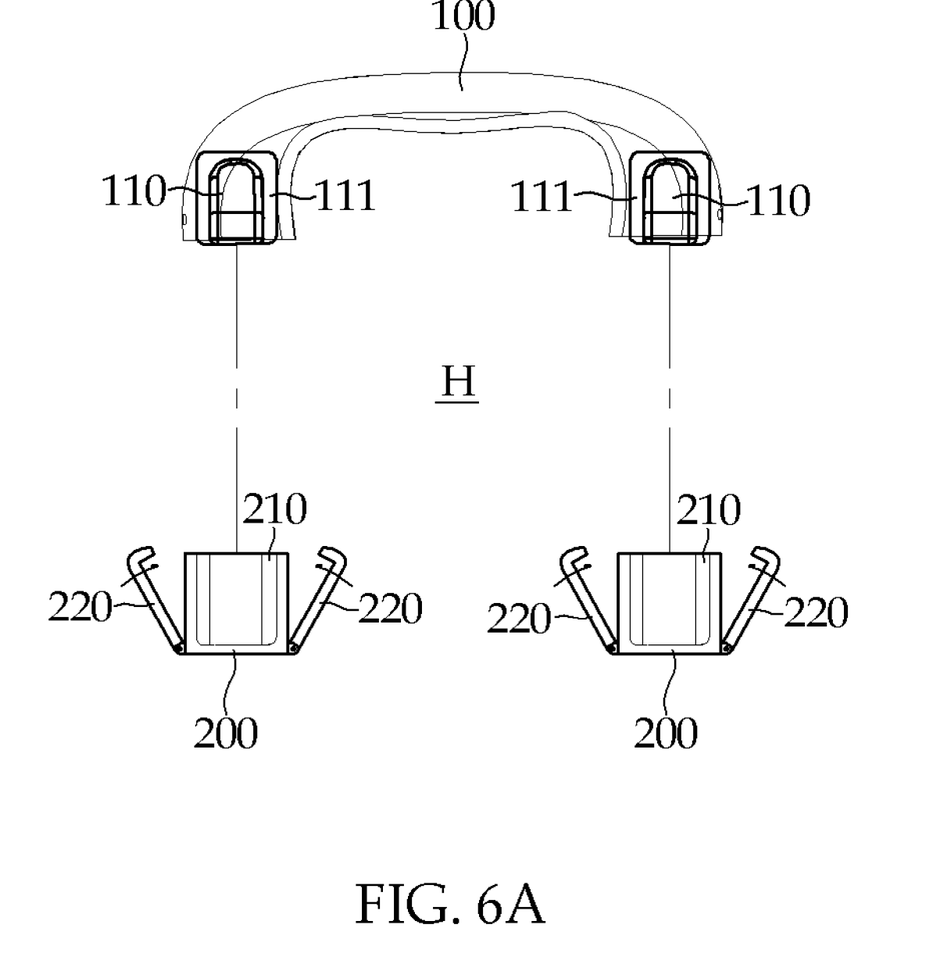
FIG. 6 is a set of bottom views illustrating states before (see FIG. 6A) and after (see FIG. 6B) the support bracket coupled to a handle body is coupled to the guide block mounted on a headliner according to the present invention.
Figure 6B:
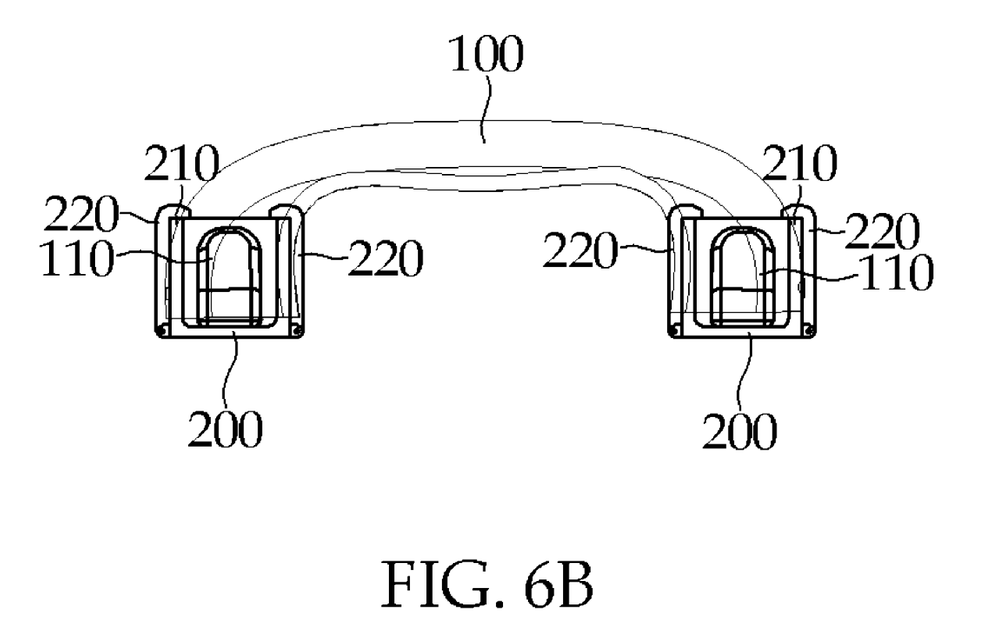

In the above-described present invention, as illustrated in FIG. 6A, the support bracket 110, which is installed with elastic support to the handle body 100 so as to be rotatable in place, is assembled with the guide block 200 pre-mounted on the headliner H in the sliding manner, and then, as illustrated in FIG. 6B, the stopper 220 is rotated to prevent the guide protrusion 111 from being separated from or pulled out of the guide 210 so as to fix the guide block 200.

Meanwhile, the support bracket 110 in a fixedly supported state may be separated from the guide block 200 by turning out the stoppers 220, and then the separated guide block 200 is connected to a sunglasses case, a storage case, or a rack in which a guide protrusion 111 is formed, and thus anything having the guide protrusion coupled to the guide block can be coupled to and separated from the guide block, and the assist handle can be used for various purposes.

A vehicle assist handle according to the present invention has the following effects.

(1) As an assist handle fixedly installed on a headliner is formed to be separable, the utilization of a limited space in a vehicle can be improved.

(2) In addition, not only an assist handle but also a sunglasses case, a storage case, or a rack, which can be assembled with a guide block, can be mounted on the guide block which fixedly supports the assist handle on a headliner and used.

(3) Accordingly, even when a vehicle travels, an assist handle can be used for various purposes, such as other components being substituted and used when the assist handle is not used, and other components such as a rope or a sunglasses case are hung during camping using a vehicle.

(4) Meanwhile, when an assist handle is assembled with a guide block in a sliding manner, the assist handle is assembled by being pushed in a direction parallel to a surface of a headliner, and thus the assist handle can be used safely and conveniently by sufficiently withstanding a weight even when the weight of an occupant is applied to the assist handle.

What is claimed is:

1. A vehicle assist handle comprising a support bracket which elastically supports a handle body mounted on a headliner of a vehicle, gripped and used by a hand of an occupant, and supported to be forcibly rotated, wherein:

the support bracket is separated from the headliner and detachably installed on a guide block mounted at a position of the separated headliner;

guide protrusions are formed to protrude from both sides of a surface of the support bracket facing the guide block;

a guide is formed in the guide block to slidably guide the protrusion; and stoppers, which face each other and in which one side is installed to be rotated in place and the other side is caught on the guide protrusion seated in the guide to perform a latching action, are formed outside the guide block.

2. The vehicle assist handle of claim 1, wherein the guide is formed parallel to a surface of the headliner on which the guide block is mounted to slidably guide the guide protrusion to the guide block in a direction intersecting a direction in which the hand of the occupant gripes and pulls the handle body.

3. The vehicle assist handle of claim 1, wherein a sunglasses case, a storage case, or a rack formed to be fitted into and slidably guided by the guide is hung on the guide block so that the guide block has a multipurpose use.

* * * * *